(12) United States Patent
Long et al.

(10) Patent No.: US 9,642,307 B2
(45) Date of Patent: May 9, 2017

(54) HEADER END HOOD MOUNT FOR AN AGRICULTURAL HARVESTER

(71) Applicant: CNH Industrial America LLC, New Holland, PA (US)

(72) Inventors: Zachary Long, Harleysville, PA (US); Bradley Wenger, Lancaster, PA (US); Andrew V. Lauwers, Stevens, PA (US); Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 54 days.

(21) Appl. No.: 14/707,753

(22) Filed: May 8, 2015

(65) Prior Publication Data

US 2016/0324072 A1 Nov. 10, 2016

(51) Int. Cl.
*A01D 45/02* (2006.01)
*A01D 63/00* (2006.01)
*A01D 63/04* (2006.01)

(52) U.S. Cl.
CPC ........... *A01D 63/00* (2013.01); *A01D 45/021* (2013.01); *A01D 63/04* (2013.01)

(58) Field of Classification Search
CPC ...... A01D 45/021; A01D 63/04; A01D 63/00; A01D 63/02
USPC .................................................. 56/314, 109
See application file for complete search history.

(56) References Cited

U.S. PATENT DOCUMENTS

| | | | | |
|---|---|---|---|---|
| 1,936,760 A | * | 11/1933 | Hitchcock | A01D 45/021 56/103 |
| 4,333,304 A | | 6/1982 | Greiner et al. | |
| 4,445,314 A | * | 5/1984 | Gust | A01D 41/147 56/119 |
| 4,553,379 A | * | 11/1985 | Kalverkamp | A01D 45/021 56/106 |
| 4,757,673 A | * | 7/1988 | Gayman | A01D 63/04 172/502 |
| 5,195,309 A | * | 3/1993 | Mossman | A01D 45/021 56/105 |
| 5,787,697 A | * | 8/1998 | Post | A01D 45/021 56/119 |
| 5,865,019 A | * | 2/1999 | Hurlburt | A01D 45/021 56/118 |
| 5,910,092 A | * | 6/1999 | Bennett | A01D 45/021 56/119 |

(Continued)

FOREIGN PATENT DOCUMENTS

| | | |
|---|---|---|
| EP | 1036495 A1 | 9/2000 |
| EP | 1142467 B1 | 6/2004 |

(Continued)

*Primary Examiner* — Árpád Fábián-Kovács
(74) *Attorney, Agent, or Firm* — Peter K. Zacharias; Patrick M. Sheldrake

(57) ABSTRACT

A header end hood mount for a harvester configured to allow an end hood on a corn header to pivot about a mounting assembly. The mounting assembly is connected to the frame for mounting the hood thereon and includes a mounting bracket affixed to the frame to allow the hood to pivot between a first position covering the row unit and a second position spaced outwardly and upwardly from the first position to provide improved access to a row unit covered by an end hood during normal operation. The header end hood mount is designed to provide a pivoting motion of the hood.

17 Claims, 10 Drawing Sheets

(56) References Cited

U.S. PATENT DOCUMENTS

| | | | |
|---|---|---|---|
| 6,247,297 B1 * | 6/2001 | Becker | A01D 45/021 56/119 |
| 6,513,313 B1 * | 2/2003 | Bennett | A01D 45/021 56/119 |
| 6,817,168 B2 | 11/2004 | Underhill | |
| 7,240,471 B2 * | 7/2007 | Mossman | A01D 45/021 56/109 |
| 8,567,168 B2 * | 10/2013 | Allochis | A01D 63/02 56/109 |
| 8,640,434 B2 * | 2/2014 | Lohrentz | A01D 45/021 56/119 |
| 2003/0056482 A1 * | 3/2003 | Weichholdt | A01D 63/04 56/314 |
| 2004/0107684 A1 * | 6/2004 | Slabbinck | A01D 63/00 56/119 |
| 2007/0193242 A1 * | 8/2007 | Kost | A01D 45/021 56/119 |
| 2009/0025354 A1 * | 1/2009 | Guldenpfennig | A01D 45/021 56/119 |
| 2011/0252761 A1 * | 10/2011 | Bich | A01D 63/04 56/15.2 |
| 2012/0291410 A1 * | 11/2012 | Silver | A01D 45/021 56/119 |
| 2014/0130474 A1 * | 5/2014 | Hulstein | A01D 41/06 56/119 |
| 2014/0260165 A1 * | 9/2014 | Lohrentz | A01D 63/00 56/119 |
| 2016/0183466 A1 * | 6/2016 | Long | A01D 45/021 56/119 |

FOREIGN PATENT DOCUMENTS

| | | |
|---|---|---|
| FR | 2192443 A5 | 2/1974 |
| GB | 360016 A | 10/1931 |

* cited by examiner

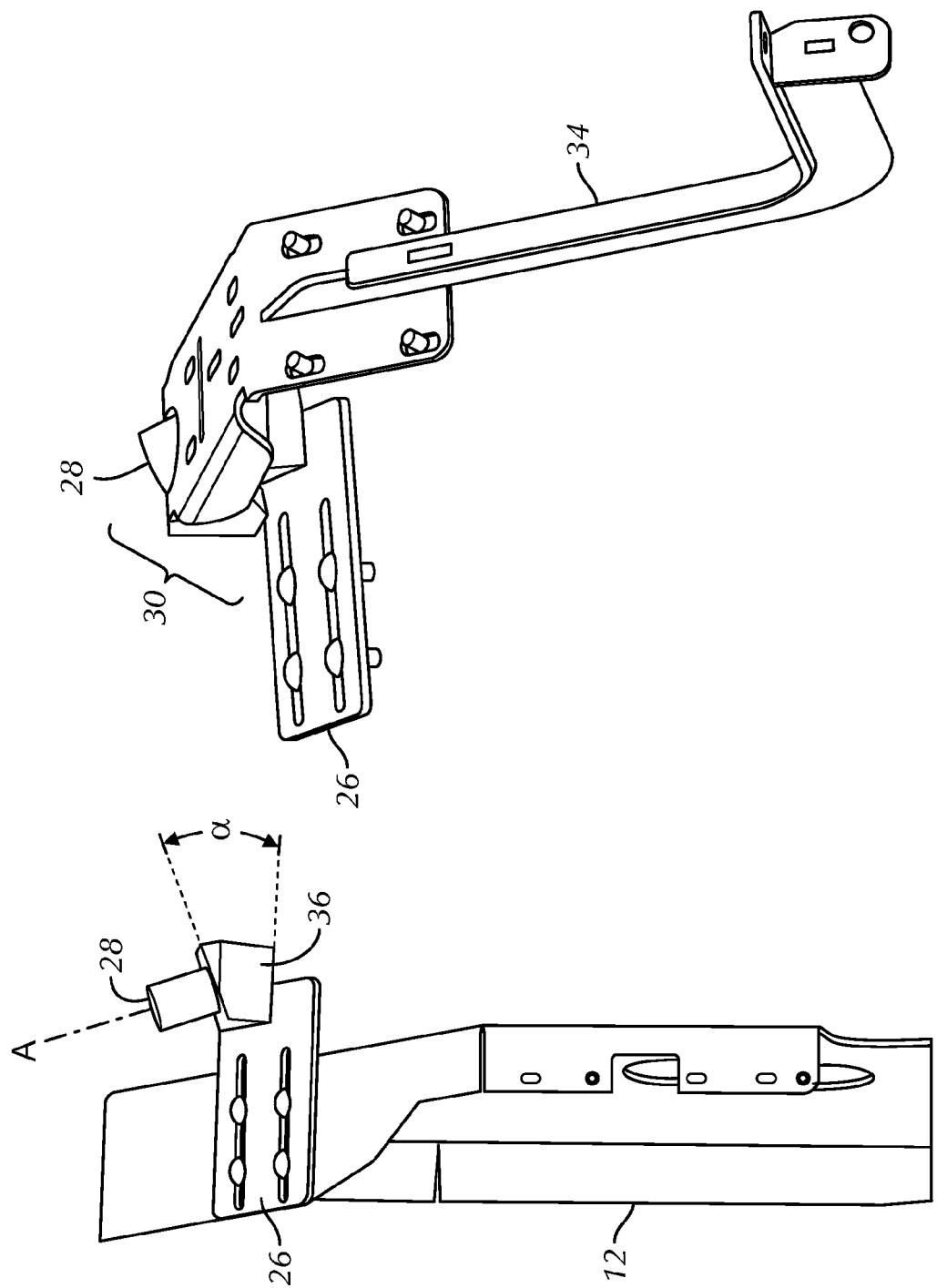

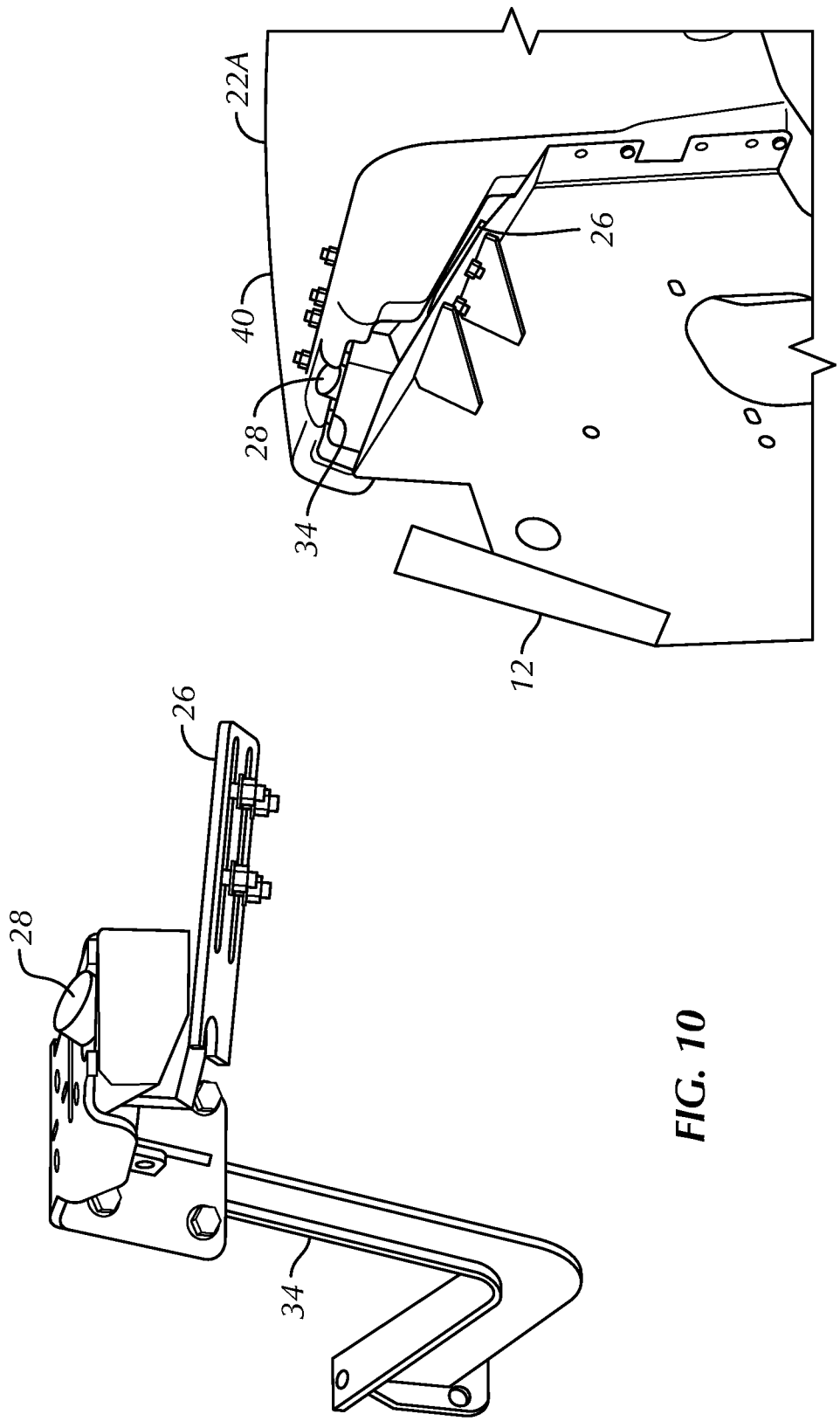

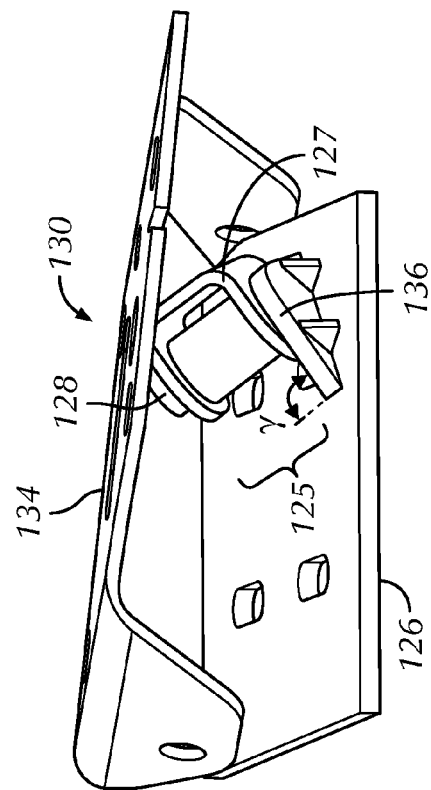
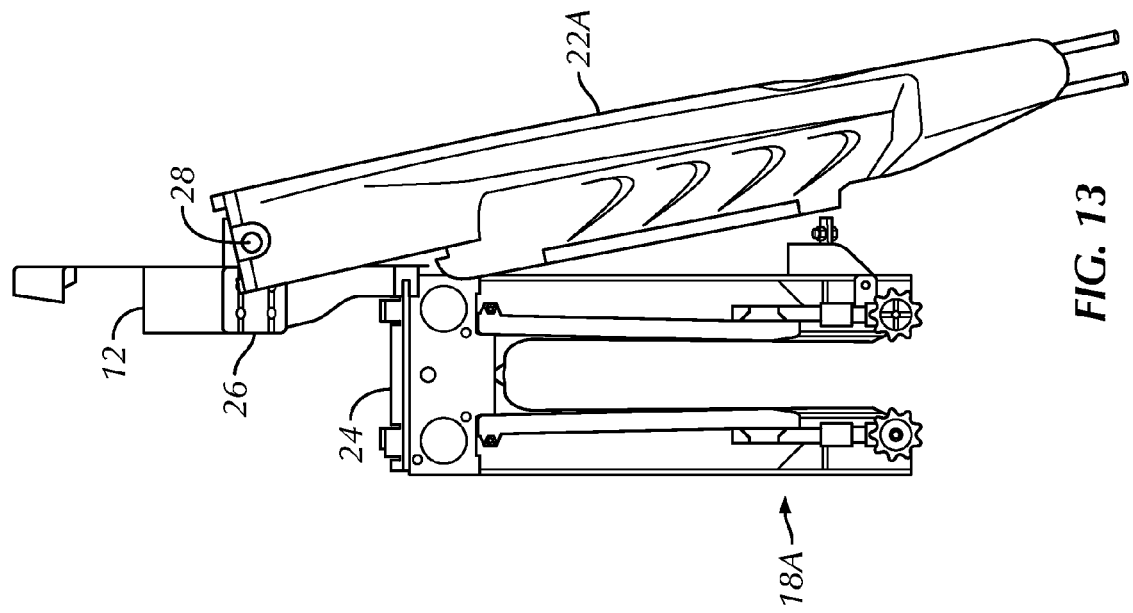

HEADER END HOOD MOUNT FOR AN AGRICULTURAL HARVESTER

BACKGROUND

The subject application relates generally to harvesting headers for use with agricultural harvesters. In particular, the subject application relates to an improved header having an end hood mount designed to allow a hood to be opened in a manner making it easier for an operator to service components during intermittent harvesting operations.

During a harvesting operation, a header at the front of the harvester cuts ripened crops from the field. The header is attached to the front of the harvester and includes mechanisms for cutting crops, gathering crops and delivering crops to the harvester's feederhouse. The header can be, e.g., a corn header having row dividers and row units equipped with gathering chains and stripping plates designed to gather and strip ears of corn from rows of ripened corn stalks.

Corn headers also have end hoods designed to protect the components underneath such as the gathering chain and other row unit components. During harvesting, crop material often jams under the end hoods leading to blockages in the gathering chain and row units. When this occurs, the operator must service the row unit and gathering chain components located underneath the end hoods in order to continue harvesting the crop. Accordingly, the operator needs access to the area under the end hoods.

Conventional crop header end hoods include a mechanism for opening and closing the end hood in order to access the immediate end row unit and gathering chain for servicing. Current corn head end hoods must be moved outwards, swing outwards, or swing upwards a significant degree to provide access to the shielded components. This significant movement in combination with the weight and bulk of the end hoods renders it difficult for the operator to open the hoods and service the affected row unit in a safe and efficient manner. As a consequence, operation of the harvester can be difficult when such row units and gathering chains are to be serviced during harvesting operations.

BRIEF SUMMARY

In accordance with a first aspect, the subject application provides a header end hood mount for a header of a harvester. The header comprises a frame, a row unit extending forwardly from the frame and a hood for covering the row unit. A mounting assembly is connected to the frame for mounting the hood thereon. The mounting assembly includes a mounting bracket affixed to the frame and a pivot extending from the mounting bracket inwardly and forwardly relative to the header. The hood pivots about the pivot to move between a first position covering the row unit and a second position spaced apart outwardly and upwardly from the first position.

In accordance with a second aspect, the subject application provides a header end hood mount for a header of a harvester. The header comprises a frame, a row unit extending forwardly from the frame, a hood for covering the row unit and a hinge connecting the hood to the frame. The hinge includes a first hinge member connected to the frame and a second hinge member connected to the hood and pivotally coupled to the first hinge member. The hood moves between a first position where the hood is above the row unit and a second position spaced apart from the first position where the hood is spaced laterally and upwardly from the row unit.

In accordance with a third aspect, the subject application provides a header end hood mount for a header of a harvester. The header comprises a frame, a row unit extending forwardly from the frame, a hood for covering the row unit and a mounting assembly connected to the frame for mounting the hood thereon. The mounting assembly includes a frame mounting bracket connected to the frame, a hood mounting bracket connected to the hood, and a pivot assembly connected to the frame mounting bracket and the hood mounting bracket. The pivot assembly includes a pivot extending inwardly and forwardly relative to the header, and a pivot coupling pivotably mounted on the pivot. The hood pivots relative to the frame about the pivot assembly to move between a first position covering the row unit and a second position spaced apart outwardly and upwardly from the row unit.

The subject application provides an improved design of swinging open an end hood on e.g., a corn head. Conventional hoods rotate directly upwards, with a pivot point in the rear of the hood. The advantage of the present design is that it changes the swinging motion of the hood to make it easier to service the row unit with minimal parts, cost, and increasing the ease of use for the operator. This is different from existing conventional designs because others just tilt their end hoods outwards, or swing it outwards, or swing it upwards. The end hood mount addresses the need for an operator to have improved access to the row unit and gathering chain area underneath the end hood in an efficient and safe manner. The improved hood end mount further allows for optimal access underneath the hood while requiring minimal movement of the hood by the operator.

The subject application provides an improved end hood mount and assembly mechanism that allows for an end hood to pivot between a first position covering the row unit and a second position spaced outwardly and upwardly from the first position to provide ready and easy access to the operational components of the header. The resultant advantages of such a construction include easier servicing of the row unit with minimal parts, cost, and increased ease of use for the operator.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application, there are shown in the drawings several aspects, but it should be understood that the subject application is not limited to the precise arrangements and instrumentalities shown.

In the drawings:

FIG. 8 is a partial front perspective view of the mounting assembly of FIG. 5;

FIG. 9 is a front perspective view of a hinge assembly of the end hood of FIG. 3;

FIG. 10 is a rear perspective view of the hinge assembly of FIG. 9;

FIG. 12 is an enlarged partial rear perspective view of a mounting assembly of the end hood of FIG. 2;

FIG. 13 is a top view of the end row unit and end hood of FIG. 3;

FIG. 15 is a perspective view of a mounting assembly in accordance with another aspect of this subject application.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
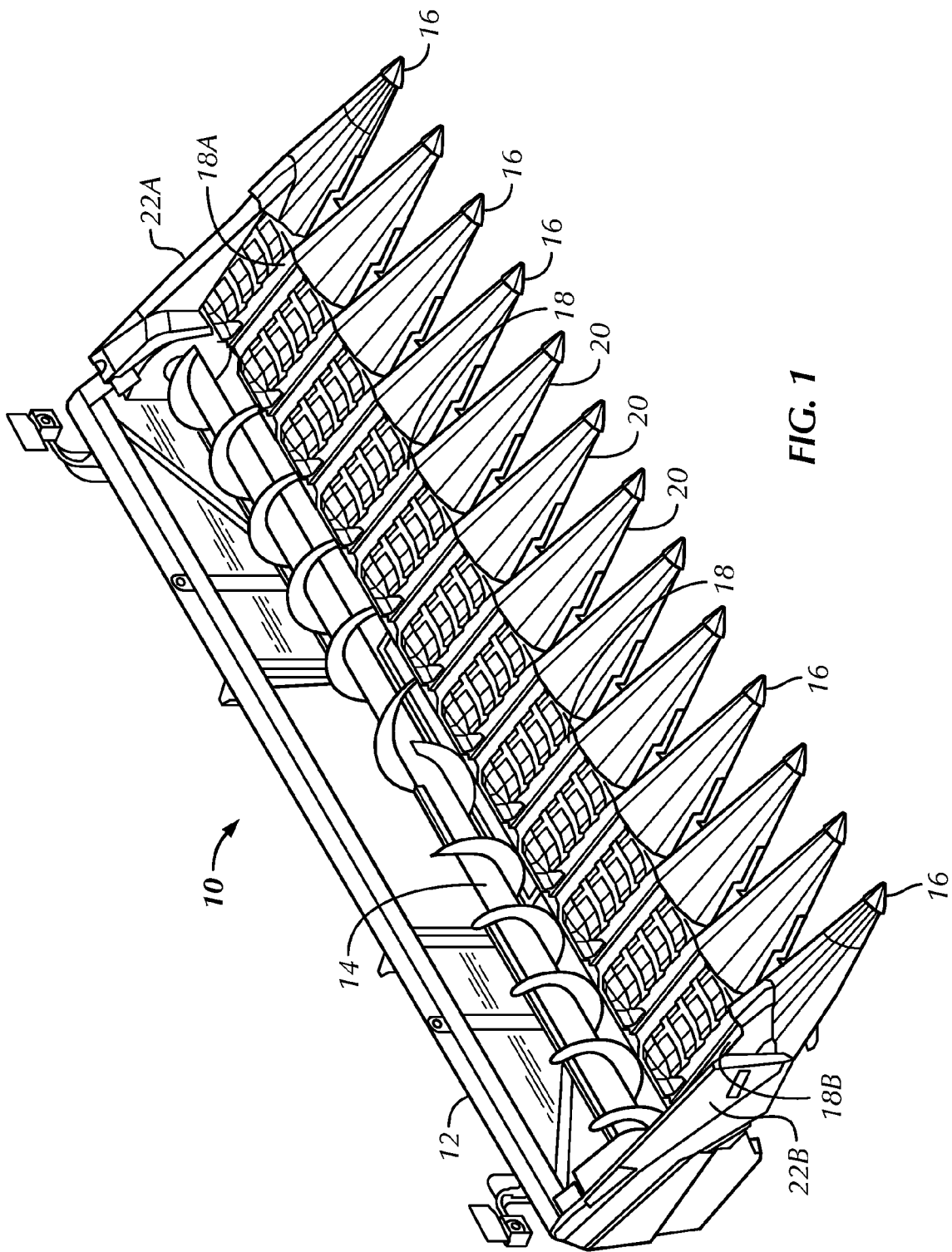
FIG. 1 is a front perspective view of a corn header assembly applicable to an aspect of the subject application.

Referring now to the drawings, wherein aspects of the subject application are shown, FIG. 1 illustrates several features of a header 10 according to the subject application. For purposes of illustration only and not by way of limitation, the header will be described e.g., as a corn header, but can alternatively be any other header having an end hood or end cover.

In FIG. 1 there is shown a front perspective view of a corn header 10 which can be attached to a combine or similar agricultural harvester (not shown). Corn header 10 includes a frame 12, an auger 14, a row unit, a hood, and a mounting assembly. The frame 12 serves generally as a chassis for the header for supporting the various components of the header which are attached thereto. Corn header 10 also includes a plurality of row dividers 16 and row units 18 extending forwardly from the frame 12, which operate to harvest multiple rows of corn simultaneously.

There are shown multiple row units 18, hoods, and dividers 16 affixed to the frame 12 of the corn header. The general structure and operation of such row units are known in the art and a detailed description of these structures, configuration and operation is not necessary for a complete understanding of the subject application. Ears of corn are stripped from rows of corn stalk by the header 10 and then carried by the auger 14 to the feeder and thresher assembly in the body of the harvester (not shown).

At each end of the frame 12, the end row units 18A, 18B are shielded by corresponding covers or end hoods 22A, 22B. The row units 18 located between the end row units are shielded by corresponding center hoods 20. For purposes of clarity, the subject application universally refers to both corresponding end hoods 22A, 22B, but only a left end hood 22A will be shown in the following figures and it is to be understood that a right end hood is a mirror image of the left end hood.

Figure 2:
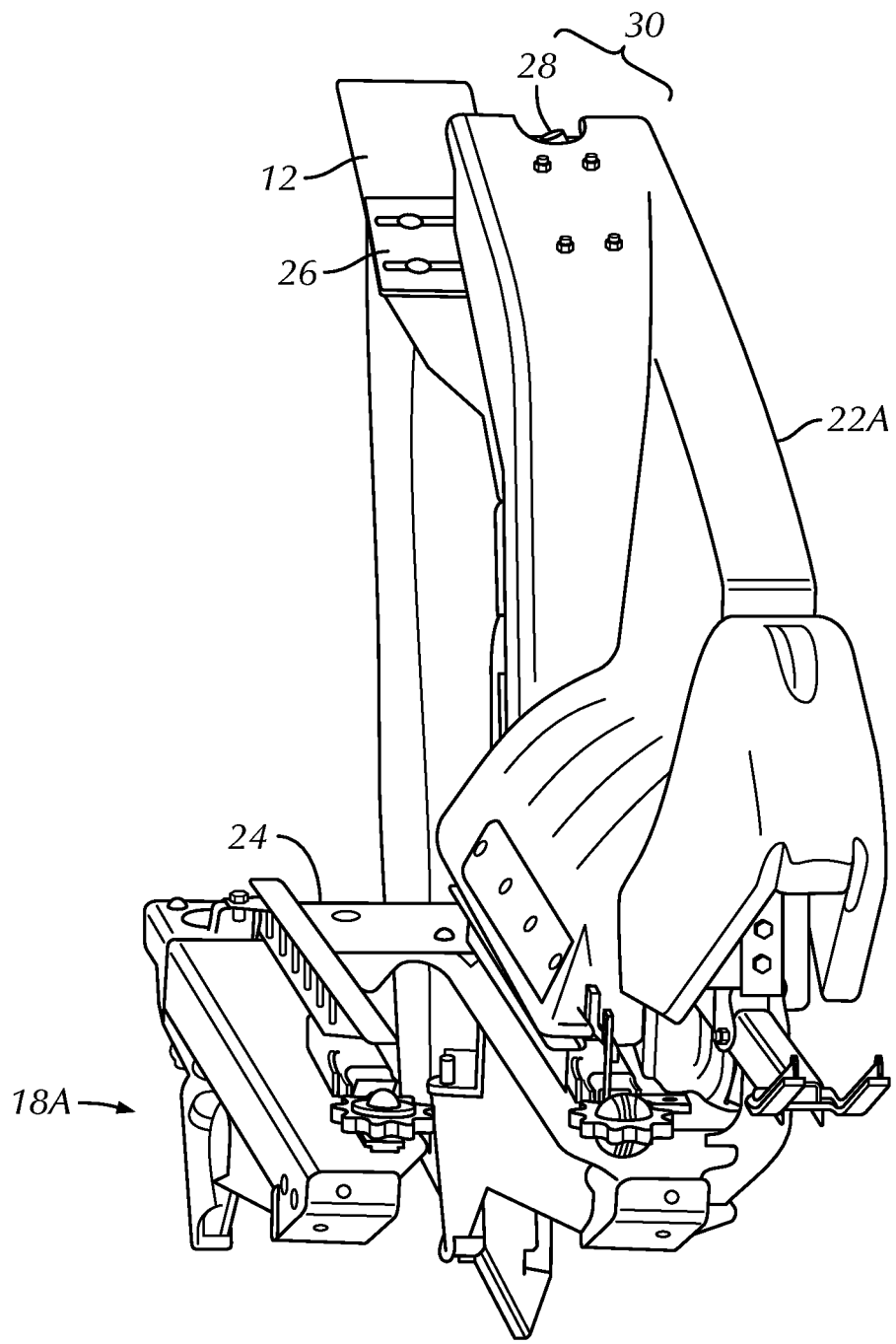
FIG. 2 is a front perspective view of an end row unit and end hood in a closed position of the header of FIG. 1.
Figure 3:
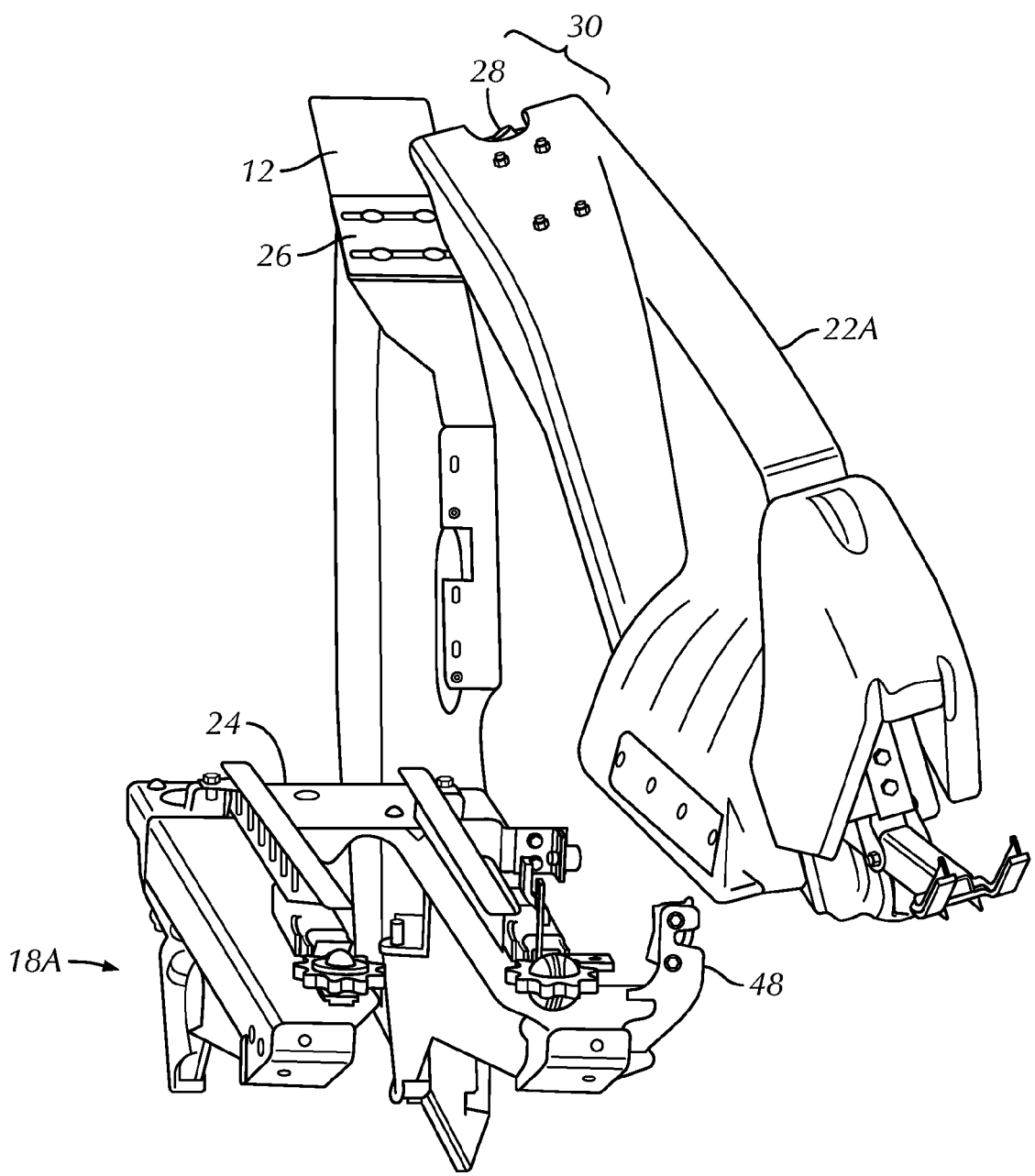
FIG. 3 is a front perspective view of the end row unit and end hood of FIG. 2, with hood in an open position.
Figure 5:
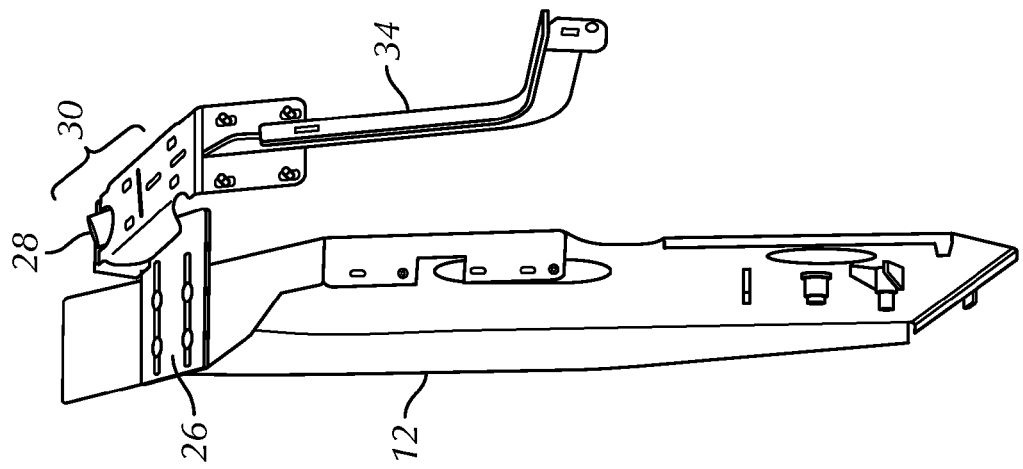
FIG. 5 is a front perspective view of a mounting assembly of the hood of FIG. 4.

Referring now to FIGS. 2 and 3, a front perspective view of end row unit 18A and end hood 22A is shown. The end hood 22A is movable between a closed position (FIG. 2) and an open position (FIG. 3) for accessing the shielded components of end row unit 18A. As further discussed below, the row unit 18A includes a row unit frame 24 about which components of the row unit are mounted to. As shown in FIG. 1, the row unit extends forwardly from the frame 12 of the header 10. Shielding the end row unit 18A is the hood 22A. As best shown in FIG. 2, in the closed position, the end hood covers the row unit. Specifically, the end hood covers a lateral portion of the row unit.

Figure 11:
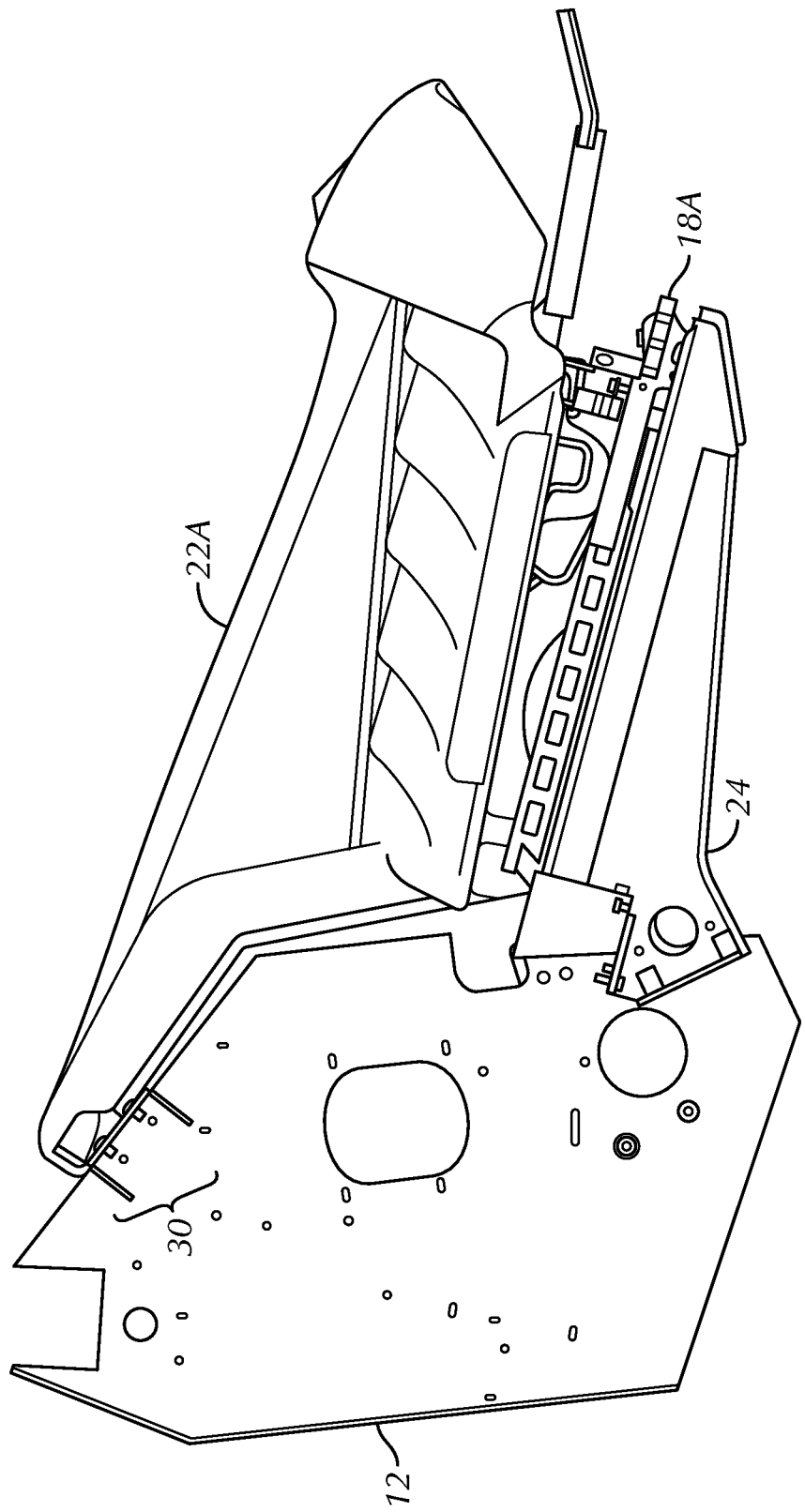
FIG. 11 is a lateral view of the end row unit and end hood of FIG. 3.

Referring now to FIGS. 5-8, the mounting assembly 30 connects to the frame 12 for mounting the hood 22A thereon. The mounting assembly includes a mounting bracket 26 and a pivot 28 which extends from the mounting bracket inwardly and forwardly relative to the header 10. As shown in FIG. 11, the mounting assembly 30 is connected to the frame 12 at a position above the row unit 18A and rearwardly of the row unit 18A. In accordance with an aspect, the mounting bracket is configured as a rectangular plate with two slots for receiving suitable fasteners, e.g., screws, pins, bolts, for affixing the mounting bracket to the frame. The slots allow for adjustable positioning of the mounting bracket on the frame to accommodate variable widths of the row units.

A raised supporting member 36 is attached to the mounting bracket 26 about a lateral side of the mounting bracket and configured, as best shown in FIG. 8. The raised supporting member has a top planar surface at an angle substantially perpendicular to a central longitudinal axis A of the pivot 28. As such, the top planar surface is at an angle α as shown in FIG. 8, which can be e.g., about 30-70 degrees relative to a plane defined by the mounting bracket 26.

In accordance with an aspect, the pivot 28 is connected to the raised supporting member 36 of the mounting bracket 26 and configured, as best shown in FIG. 8. When viewed from a front elevation view perspective, an acute angle formed by the central longitudinal axis A of the pivot 28 relative to the mounting bracket is e.g., about 50-75 degrees. When viewed from a lateral elevation view, an acute angle formed by the central longitudinal axis A of the pivot relative to the mounting bracket is e.g., about 50-75 degrees. The hood 22A mounts onto and pivots about the pivot 28. As best shown in FIG. 12, the pivot 28 is configured such that its distal end is positioned completely below an outer surface 40 of the hood 22A. In an example, the pivot can be configured as a short cylindrical boss.

In sum, the mounting assembly 30 allows the hood 22A to pivot about the pivot 28 to move between a first position covering the row unit 18A (FIG. 2) and a second position spaced apart outwardly and upwardly from the first position (as shown in FIG. 3).

In one exemplary aspect, when in a closed position, a front most end of the hood 22A can be spaced about 220-260 millimeters in a lateral direction from a center midline of the row unit frame 24 and spaced about 220-240 millimeters above the row unit frame. Further, when in an open position, the front most end of the hood 22A can be spaced about 540-580 millimeters in a lateral direction from the center midline of the row unit frame 24 and spaced about 335-355 millimeters above the row unit frame. Additionally, when in a closed position, the front most end of the hood 22A can be spaced a distance about 290-330 millimeters from a front most end of the row unit frame. When in the open position, the front most end of the hood 22A can be spaced a distance about 320-350 millimeters from the front most end of the row unit frame. In contrast, conventional designs require a hood to be moved about 12-13 times the distance of the subject application in an upward direction.

As such, in moving between the open and closed position, the hood 22A moves in three dimensions. Specifically, the front most end of the hood moves outwardly, upwardly, and rearwardly when moving from a closed position to an open position. In contrast, current end hood designs only tilt outwardly or swing upwardly and rearwardly in a two dimensional plane. In sum, the subject application allows for the hood 22A to travel along a path in three dimensional space.

Referring back to FIG. 8, as part of the mounting assembly 30, the mounting bracket 26 connects to the frame 12 and is configured to slidably or adjustably connect to the frame in a medial lateral direction of the header, e.g. in the widthwise direction. This slidable connection is achieved by the slots on the rectangular plate of the mounting bracket and the fasteners received within the slots. The fasteners fasten to the frame through the slots allowing the mounting bracket to slidably or adjustably move along the length of the slots e.g., in a widthwise direction.

Figure 4:
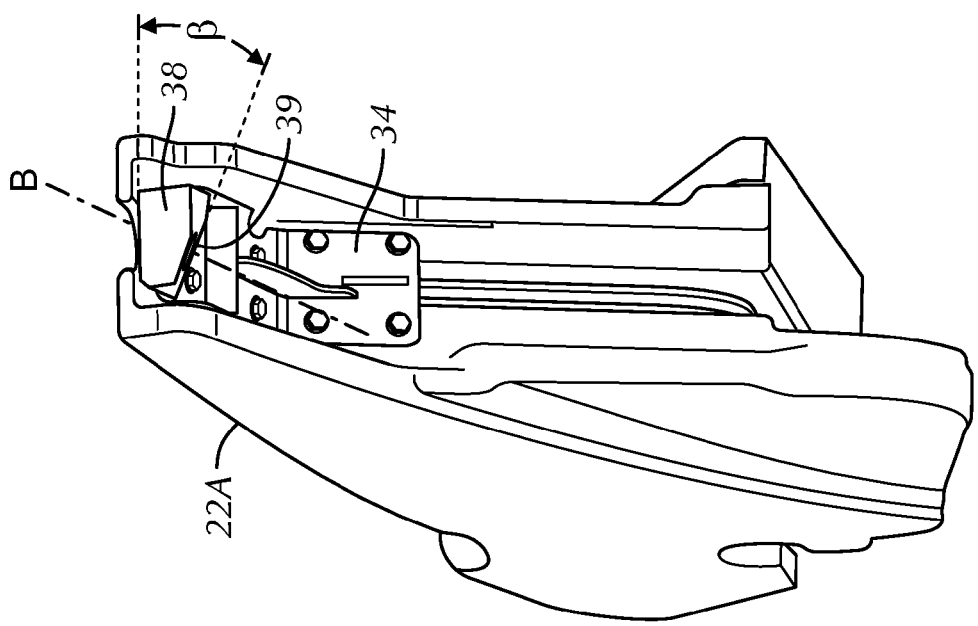
FIG. 4 is a rear perspective view of the hood of FIG. 3.

The underside of the hood 22A, is best shown in FIG. 4. The hood 22A includes a mounting frame 34 for slidably mounting the hood onto the mounting assembly 30. In accordance with an aspect, the mounting frame 34 is configured as a frame that runs along a length of the hood 22A and attaches to the underside of the hood with suitable fasteners, e.g. pins, screws, bolts.

A supporting member 38 is attached below an upper portion of the mounting frame. The supporting member has a bottom planar surface at an angle substantially perpendicular to a central longitudinal axis B of the through hole 39 extending through the supporting member. As such, the bottom planar surface is at an angle (3, as shown in FIG. 4, relative to an upper surface of the supporting member, which can be, e.g., about 30-70 degrees. The bottom planar surface of the supporting member is configured to congruently mate with the top planar surface of the raised supporting member 38 which is at angle α.

The through hole 39 on the supporting member is configured to correspondingly receive the pivot 28 extending from the mounting bracket 26 thereby allowing the mounting frame to slidably mount onto the mounting assembly 30. The central longitudinal axis B of the through hole is collinear with the central longitudinal axis A of the pivot 28 (FIG. 8).

FIG. 8 shows a front perspective view of the mounting assembly 30, specifically the mounting bracket 26 connected to the frame 12. The pivot 28 is also shown extending inwardly and forwardly relative to the header. Referring to FIG. 13, the pivot is also positioned on the frame such that it is laterally spaced from the row unit frame 24.

Figure 14:
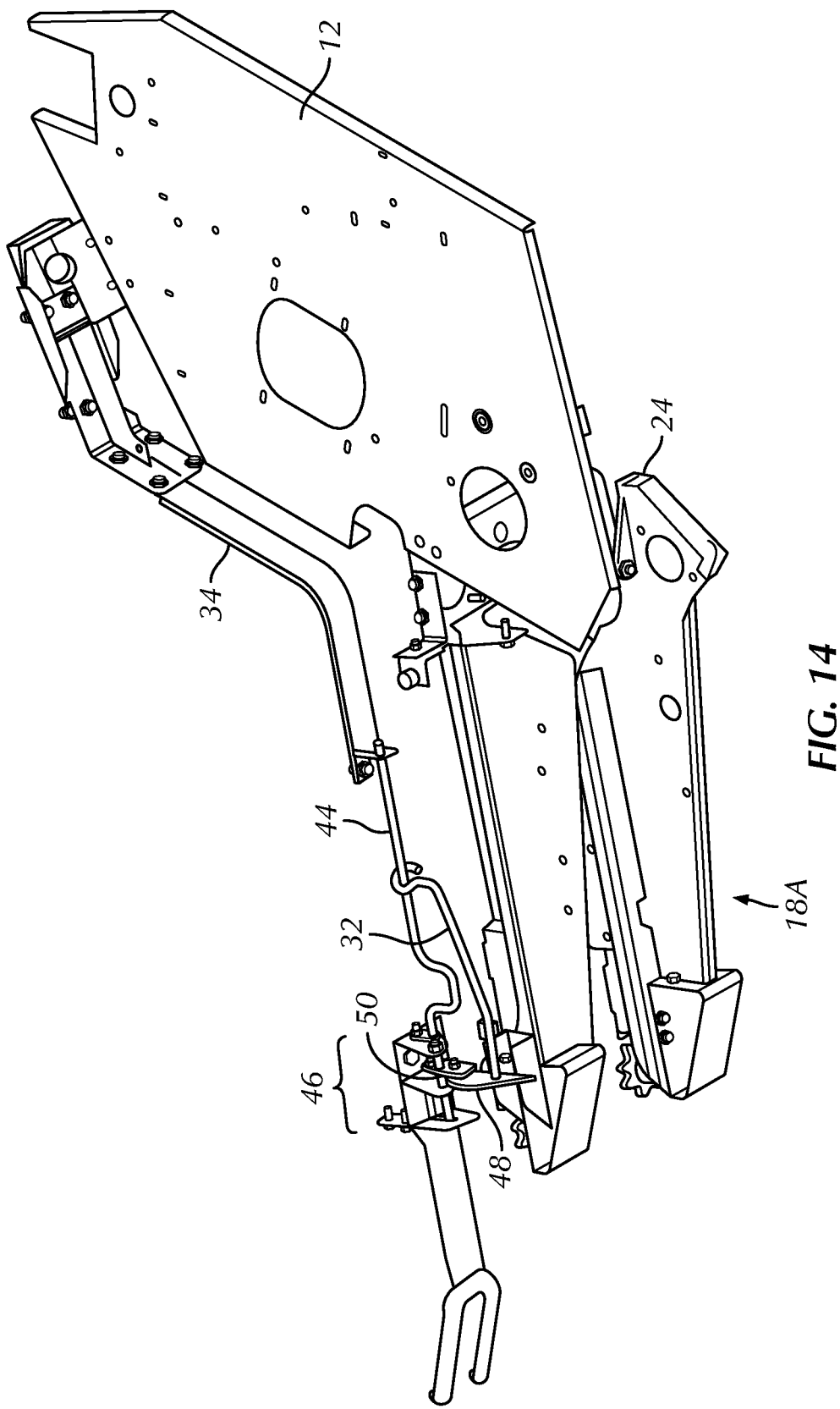
FIG. 14 is a bottom perspective view of the end hood of FIG. 2 without a hood.

Referring to FIG. 14, there is shown a prop rod 32 which limits the outward and upward rotation of the hood 22A relative to the row unit when the hood is moved into the open position and secures the hood 22A in the open position. The prop rod 32 is configured as a bent rod that extends from the row unit 18A and connects to the hood 22A having one end pivotally mounted to the row unit and an opposite end engageably coupled along a support guide bar 44 connected to the underside of the hood 22A. The prop rod 32 is engageably coupled with the support guide bar 44 by a circular wire loop with an aperture for receiving the support guide bar. The support guide bar is generally located in a pocket located midway or centrally between the rear of the hood 22A and the front of the hood 22A and contains a U-shaped ridge towards the front end. The circular wire loop pivots down the support guide bar 44 when the hood 22A is moved into the open position and pivots up the support guide bar when the hood is moved into the closed position. When the hood is opened, the circular wire loop of the prop rod pivots down the support guide bar until it reaches the U-shaped ridge to form an abutting relationship to restrict the prop rod against further movement in that direction. This abutting relationship serves to limit the outward movement of the hood 22A and provide support for the hood in the open position. When the hood 22A is in the closed position, the prop rod 32 is held underneath the closed hood.

Additionally, in FIG. 14, there is shown a latch mechanism 46 that secures the hood 22A to the row unit 18A in the closed position (FIG. 2). The latch mechanism includes a catcher 48 mounted to the side of the row unit 18A which includes a hook-like jaw for engaging and securing a corresponding striker 50 mounted to the underside of the hood 22A. The striker 50 is illustrated as comprising a conventional cylindrical member engageable with the catcher. When the hood 22A is moved from the open position to the closed position, the striker is latchingly received within a groove of the catcher. The latch mechanism serves to secure and prevent the hood 22A from swinging open during harvesting operation.

Figure 7:
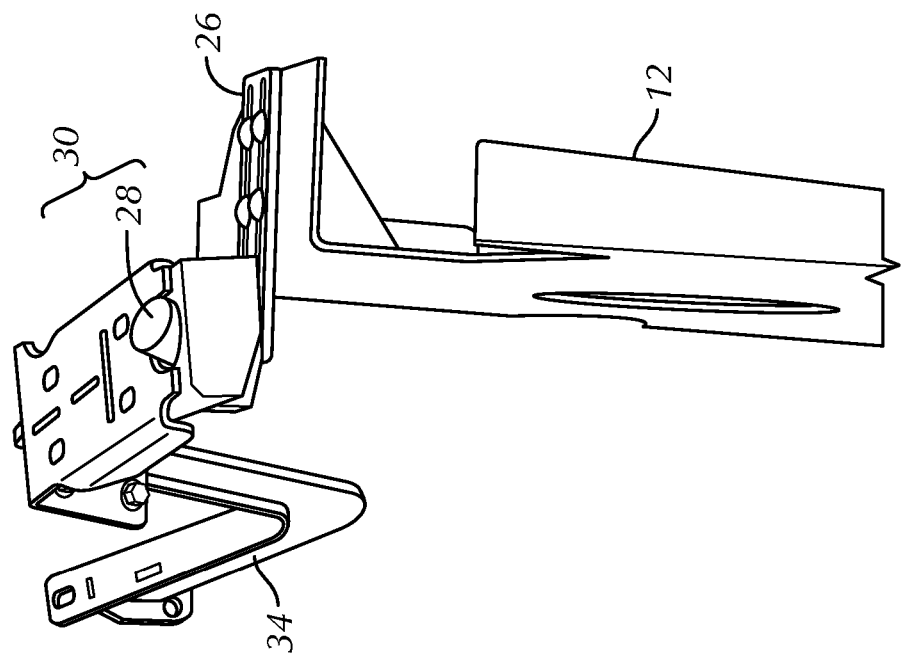
FIG. 7 is a partial rear perspective view of the mounting assembly of FIG. 5.
Figure 6:
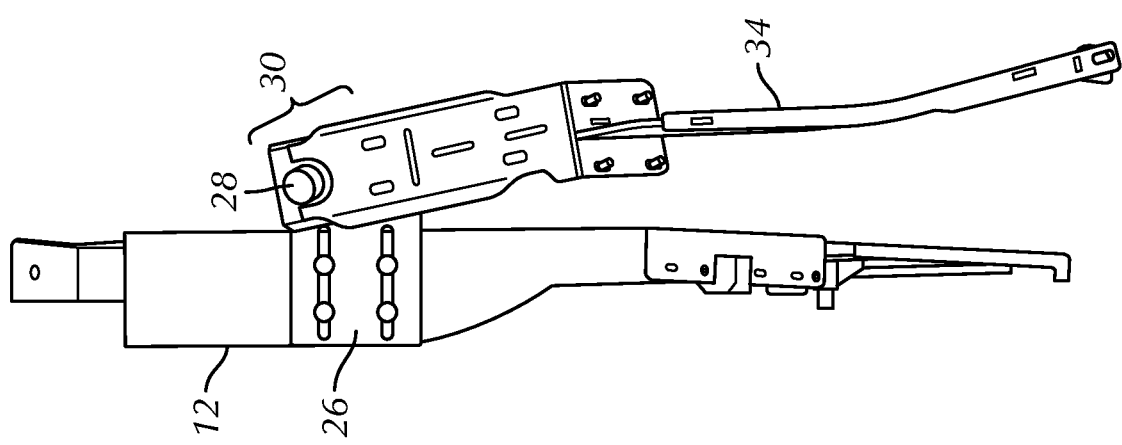
FIG. 6 is a top view of the mounting assembly of FIG. 5.

Alternatively expressed, the mounting assembly 30 can be viewed as a hinge 30, as shown in FIGS. 6, 7 and 9. Hinge 30 connects the hood 22A to the frame 12, as shown in FIG. 2. The hinge 30 includes a first hinge member 26 connected to the frame 12 and a second hinge member 34 which connects to the hood 22A. The second hinge member 34 is pivotally coupled to the first hinge member 26 by a pivot 28. The hinge 30 pivots about the pivot which extends inwardly and forwardly relative to the frame 12. The pivot connection between the hinge members 26 and 34 enables the hood 22A to move between a first position wherein the hood 22A is above the row unit 18A and a second position spaced apart from the first position wherein the hood 22A is spaced laterally and upwardly from the row unit 18A, as shown in FIG. 3. Referring to FIG. 13, the row unit 18A includes a row unit frame 24 and the hinge 30 pivots about the pivot 28 laterally spaced from the row unit frame. FIG. 10 provides a rear perspective view of the hinge shown in FIG. 9.

As shown in FIG. 11, the hinge 30 is connected to the frame 12 at a position above the row unit 18A and rearwardly of the row unit 18A. As part of the hinge 30, the first hinge member 26 connects to the frame 12 and is configured to slidably or adjustably connect to the frame in a medial lateral direction of the header, e.g. in the widthwise direction. Additionally, the hinge has a single rotational degree of freedom.

In accordance with another aspect of the subject application there is shown in FIG. 15 a perspective view of an alternative mounting assembly 130. The mounting assembly 130 connects to the frame 12 (not shown) for mounting the hood 22A thereon. The mounting assembly 130 includes a frame mounting bracket 126 for connection to the frame, a hood mounting bracket 134 for connecting to the hood 22A, and a pivot assembly 125. The frame mounting bracket 126 is configured as a rectangular plate with multiple apertures designed to receive suitable fasteners, e.g. pins, nails, bolts, to affix the frame mounting bracket to the frame. Alternatively, the frame mounting bracket can be configured with any other shape suitable for its intended purpose, such as a square, circle and the like. Additionally, the frame mounting bracket 126 is slidably or adjustably connected to the frame. A planar supporting member 136 extends out of the frame mounting bracket at an obtuse angle γ of about 100-130 degrees relative to the frame mounting bracket 126. The hood mounting bracket 134 is configured as a rectangular plate with lipped edges and includes multiple apertures designed to receive suitable fasteners to affix to the hood.

Alternatively, the hood mounting bracket 134 can be configured with any other shape suitable for its intended purpose, such as a square, circle and the like. The pivot assembly 125 connects the frame mounting bracket 126 and the hood mounting bracket 134 together. The pivot assembly 125 includes a pivot 128 extending inwardly and forwardly relative to the header and a pivot coupling 127 pivotably mounted on the pivot. In this aspect, the pivot is configured as a short cylindrical boss mounted on the planar supporting member 136 of the frame mounting bracket 126. Moreover, the pivot assembly 125 has a single rotational degree of freedom. The pivot coupling 127 is configured as a C-shaped bracket having a cylindrical body section extending between ends of the C-shaped bracket with apertures at each end designed to receive the pivot. The pivot coupling is connected to the hood mounting bracket 134. This allows the hood to pivot relative to the frame about the pivot assembly 125 to move between a first position covering the row unit and a second position spaced apart outwardly and upwardly from the row unit.

The apparatuses described hereinabove represents an improvement over existing header end hood mount designs. For example, the hood is able to move between a first and second position about a single rotational degree of freedom and pivots about the pivot in three dimensions relative to the frame. The pivot of the subject application allows for a swiveling motion of the hood by swinging the hood in a single upward and outward direction simultaneously relative to the row unit. By virtue of its ability to allow the hood to be moved minimally while providing optimal access to the row unit and gathering chains, the subject application is an improvement over the existing designs. For example, existing conventional designs require the operator to move the hood nearly 12 to 13 times the distance upwards compared to the subject application.

The subject application advantageously provides for the front part of the hood to move away sufficiently with less distance compared to conventional header end hood mount designs. That is, in conventional designs, end hoods are limited to tilting to the side or moving upwards thereby requiring the operator to exert more effort in lifting the hood when servicing the row unit and to a greater extent lifting the tip of the hood e.g., about 1200-1400 millimeters vertically. The task of moving the bulky header end hoods such large distances subjects the operator to dangerous and inefficient conditions. In order to move conventional end hoods, the operator may require additional manpower to lift the hood in an upward direction. Additionally, the operator is subjected to greater danger if required to work underneath the hood because of the potential for a hood falling down. In comparison, the subject application only requires a limited range of movement of about 290-350 millimeters outwardly and about 92-132 millimeters upwardly resulting in safer access to a row unit. Specifically, the subject end hood mount rotates between about 5-25 degrees while existing designs require the operator to lift the bulky hood about 31-45 degrees in a directly upwardly direction.

As such, the subject application significantly reduces the amount of movement required for adequate access to the underlying components with less dangerous conditions for the operator. Moreover, allowing for the combined lateral and upward movement, the subject application provides unlimited clearance in front of a row unit since the front of the row unit is moved laterally out of the way, e.g., about 50-125 millimeters of clearance on the side of the row unit, to facilitate the removal of underlying components. Thus, there is no need for the operator to necessarily position himself underneath the end hood, which could give rise to dangerous conditions of a falling end hood, in order to service the row unit with the new design.

It will be appreciated by those skilled in the art that changes could be made to the various aspects described above without departing from the broad inventive concept thereof. For example, designs could accommodate row unit corn headers of multiple widths. It is to be understood, therefore, that the subject application is not limited to the particular aspects disclosed, but it is intended to cover modifications within the spirit and scope of the subject application as defined by the appended claim.

What is claimed is:

1. A header of a harvester comprising:
   a frame;
   a row unit extending forwardly from the frame;
   a hood for covering the row unit; and
   a mounting assembly connected to the frame for mounting the hood thereon, the mounting assembly including:
      a mounting bracket slidably connected to the frame in a medial lateral direction of the header, and
      a pivot extending from the mounting bracket inwardly and forwardly relative to the header,
      wherein the hood pivots about the pivot to move between a first position covering the row unit and a second position spaced apart outwardly and upwardly from the first position.

2. The header of claim 1, wherein the hood includes a mounting frame for slidably mounting onto the mounting assembly.

3. The header of claim 1, wherein the mounting assembly is connected to the frame above the row unit and rearwardly of the row unit.

4. The header of claim 1, wherein the row unit includes a row unit frame and the pivot is laterally spaced from the row unit frame.

5. The header of claim 1, wherein the pivot is positioned completely below an outer surface of the hood.

6. The header of claim 1, wherein the hood moves between the first and second positions about a single rotational degree of freedom.

7. A header of a harvester comprising:
   a frame;
   a row unit extending forwardly from the frame;
   a hood for covering the row unit; and
   a hinge connecting the hood to the frame, wherein the hinge includes:
      a first hinge member slidably connected to the frame in a medial lateral direction of the header, the first hinge member extending inwardly and forwardly relative to the header, and
      a second hinge member connected to the hood and pivotally coupled to the first hinge member,
      wherein the hood moves between a first position wherein the hood is above the row unit and a second position spaced apart from the first position wherein the hood is spaced laterally and upwardly from the row unit.

8. The header of claim 7, wherein the hinge is connected to the frame above the row unit and rearwardly of the row unit.

9. The header of claim 7, wherein the hinge pivots about an axis extending inwardly and forwardly relative to the frame.

10. The header of claim 7, wherein the row unit includes a row unit frame and the hinge pivots about an axis laterally spaced from the row unit frame.

11. The header of claim 7, wherein the hinge has a single rotational degree of freedom.

12. A header of a harvester comprising:
a frame;
a row unit extending forwardly from the frame;
a hood for covering the row unit; and
a mounting assembly connected to the frame for mounting the hood thereon, the mounting assembly including:
  a frame mounting bracket slidably connected to the frame in a medial lateral direction of the header,
  a hood mounting bracket connected to the hood, and
  a pivot assembly connected to the frame mounting bracket and the hood mounting bracket, the pivot assembly including:
    a pivot extending inwardly and forwardly relative to the header, and
    a pivot coupling pivotably mounted on the pivot,
    wherein the hood pivots relative to the frame about the pivot assembly to move between a first position covering the row unit and a second position spaced apart outwardly and upwardly from the row unit.

13. The header of claim 12, wherein the mounting assembly is connected to the frame above the row unit and rearwardly of the row unit.

14. The header of claim 12, wherein the frame mounting bracket is adjustably connected to the frame.

15. The header of claim 12, wherein the row unit includes a row unit frame and the pivot is laterally spaced from the row unit frame.

16. The header of claim 12, wherein the pivot is positioned completely below an outer surface of the hood.

17. The header of claim 12, wherein the pivot assembly has a single rotational degree of freedom.

* * * * *